(12) United States Patent
Shaheen

(10) Patent No.: US 7,417,970 B2
(45) Date of Patent: Aug. 26, 2008

(54) CONFIGURING AN INTERWORKING WIRELESS LOCAL AREA NETWORK USER EQUIPMENT TO ACCESS A 3GPP SYSTEM

(75) Inventor: Kamel M. Shaheen, King of Prussia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 421 days.

(21) Appl. No.: 11/096,141

(22) Filed: Mar. 31, 2005

(65) Prior Publication Data

US 2005/0271013 A1    Dec. 8, 2005

Related U.S. Application Data

(60) Provisional application No. 60/576,698, filed on Jun. 2, 2004.

(51) Int. Cl.
*H04Q 7/00* (2006.01)
*H04Q 7/24* (2006.01)
*H04L 1/14* (2006.01)
*H04L 12/66* (2006.01)

(52) U.S. Cl. .................... 370/331; 370/338; 370/231; 370/329; 370/352; 370/356

(58) Field of Classification Search ............... 370/331, 370/338, 231, 329, 352, 356
See application file for complete search history.

(56) References Cited

U.S. PATENT DOCUMENTS

2004/0066769 A1* 4/2004 Ahmavaara et al. ......... 370/338

| | | | |
|---|---|---|---|
| 2004/0097232 A1 | 5/2004 | Haverinen | |
| 2005/0025164 A1* | 2/2005 | Kavanagh et al. | 370/401 |
| 2006/0050667 A1* | 3/2006 | Verma et al. | 370/338 |
| 2006/0165027 A1* | 7/2006 | Heden | 370/328 |
| 2006/0209768 A1* | 9/2006 | Yan et al. | 370/338 |

FOREIGN PATENT DOCUMENTS

WO    03/105493    12/2003
WO    04/006447    1/2004

OTHER PUBLICATIONS

3GPP TS 23.234, "Technical Specification Group Services and System Aspects; 3GPP System to Wireless Local Area Network (WLAN) Interworking; System Description"; 3rd Generation Partnership Project; V6.0.0; Release 6; Mar. 2004; pp. 1-83.
Third Generation Partnership Project, "Technical Specification Group Services and System Aspects; 3GPP system to Wireless Local Area Network (WLAN) interworking; System description (Release 6)," 3GPP TS 23.234 V6.4.0 (Mar. 2005).

* cited by examiner

*Primary Examiner*—Barry W Taylor
(74) *Attorney, Agent, or Firm*—Volpe and Koenig, P.C.

(57) ABSTRACT

A method for configuring an interworking wireless local area network (I-WLAN) user equipment (UE) to access a third generation partnership project (3GPP) system begins by initiating a connection from a UE to the 3GPP system, the initiating step including indicating the UE's interworking protocol capabilities. Authentication and authorization of the UE connection by the WLAN to the 3GPP system is requested, including indicating the UE's interworking protocol capabilities. The 3GPP system determines whether to accept the UE's request, including examining the UE's interworking protocol capabilities. An interworking protocol is instantiated at the UE, whereby the UE is configured to interwork with the 3GPP system.

9 Claims, 3 Drawing Sheets

CONFIGURING AN INTERWORKING WIRELESS LOCAL AREA NETWORK USER EQUIPMENT TO ACCESS A 3GPP SYSTEM

CROSS REFERENCE TO RELATED APPLICATIONS

This application claims the benefit of U.S. Provisional Application Ser. No. 60/576,698, filed Jun. 2, 2004, which is incorporated by reference as if fully set forth herein.

FIELD OF INVENTION

The present invention relates to configuring an interworking wireless local area network (I-WLAN) user equipment (UE). More particularly, the present invention relates to a method and an apparatus for configuring an I-WLAN UE to access a 3GPP based packet switched (PS) system via an I-WLAN.

BACKGROUND

Currently, there are several WLAN interworking schemes with 3GPP systems (UMTS). In one scheme, the end to end tunnel approach, the UE establishes a tunnel with the 3GPP based system ending at a Packet Data Gateway (PDG). The tunnel goes through a WLAN Gateway (WAG) without being terminated at the WAG (and is transparent to the WAG). This scheme has been standardized as a preferred configuration that all I-WLAN UEs must implement.

The second scheme is the switched tunneling approach, which involves establishing two tunnels between the PDG and the UE at the WAG. The first tunnel between the WAG and the PDG uses existing 3GPP based general packet radio service (GPRS) tunneling protocol (GTP) and the second tunnel follows the normal IP tunneling protocol.

A third interworking scheme is the Generic Access approach, which involves the tunneling of the traffic from the 3GPP system to the 3GPP-based UE via the I-WLAN. In this scheme, the I-WLAN acts as a pseudo 3GPP Node B interworking with the 3GPP system at the radio access network (RAN) level. The traffic passes through the I-WLAN access point (AP) to the I-WLAN UE which decodes the traffic back to 3GPP formats and passes it to the 3GPP-based terminal.

The existence of these schemes creates potential conflicts regarding the preferred mode of operation. For example: 1) the UE is capable of supporting all of the configurations, but does not know what configuration is supported by the network; 2) the UE is only capable of supporting one scheme (for example, the end to end tunneling architecture), but the network is configured to use another interworking scheme (for example, the switched tunneling solution); 3) the UE and the network are capable of supporting all schemes, but currently there is no way to communicate the preferred mode of operation between the two sides.

These schemes are different in terms of operational protocols and parameters. The end result is that multiple techniques or schemes may be used to support I-WLAN interworking with 3GPP systems (cellular in general), which mandates that the UE should either support all of these schemes or some mechanism to decide which scheme is being supported at the infrastructure level and then configures the UE to operate in accordance with the supported scheme. During the set-up, there should be procedures to inform the UE of the network configuration, such that it uses the right interworking protocol.

SUMMARY

According to the present invention, a UE initiates connection to a 3GPP system via an I-WLAN while indicating the UE's interworking configuration capabilities. An I-WLAN indicates the UE's interworking configuration capabilities to the 3GPP system while requesting authentication and authorization. The 3GPP system informs the UE regarding the use of interworking configurations. The UE chooses a preferred interworking configuration of the 3GPP system.

A method for configuring an interworking wireless local area network (I-WLAN) user equipment (UE) to access a third generation partnership project (3GPP) system begins by initiating a connection from a UE to the 3GPP system, the initiating step including indicating the UE's interworking protocol capabilities. Authentication and authorization of the UE connection by the WLAN to the 3GPP system is requested, including indicating the UE's interworking protocol capabilities. The 3GPP system determines whether to accept the UE's request, including examining the UE's interworking protocol capabilities. An interworking protocol is instantiated at the UE, whereby the UE is configured to interwork with the 3GPP system.

A system for configuring an interworking wireless local area network (I-WLAN) user equipment (UE) to access a third generation partnership project (3GPP) system includes a UE, a WLAN, and a 3GPP system. The UE includes initiating means for initiating a connection request to the 3GPP system; first indicating means for indicating the interworking protocol capabilities of the UE to the WLAN; and instantiating means for instantiating a selected interworking protocol. The WLAN includes second indicating means for indicating the interworking protocol capabilities of the UE to the 3GPP system. The 3GPP system includes first determining means for determining whether to accept a connection request from the UE; second determining means for determining the interworking protocol capabilities of the UE and the 3GPP system; and selecting means for selecting an interworking protocol to be used between the UE and the WLAN.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Hereafter, a user equipment (UE) includes, but is not limited to, a wireless transmit/receive unit (WTRU), a mobile station, a fixed or mobile subscriber unit, a pager, or any other type of device capable of operating in a wireless environment. When referred to hereafter, a base station includes, but is not limited to, a Node B, a site controller, an access point, or any other type of interfacing device in a wireless environment.

Figure 1:
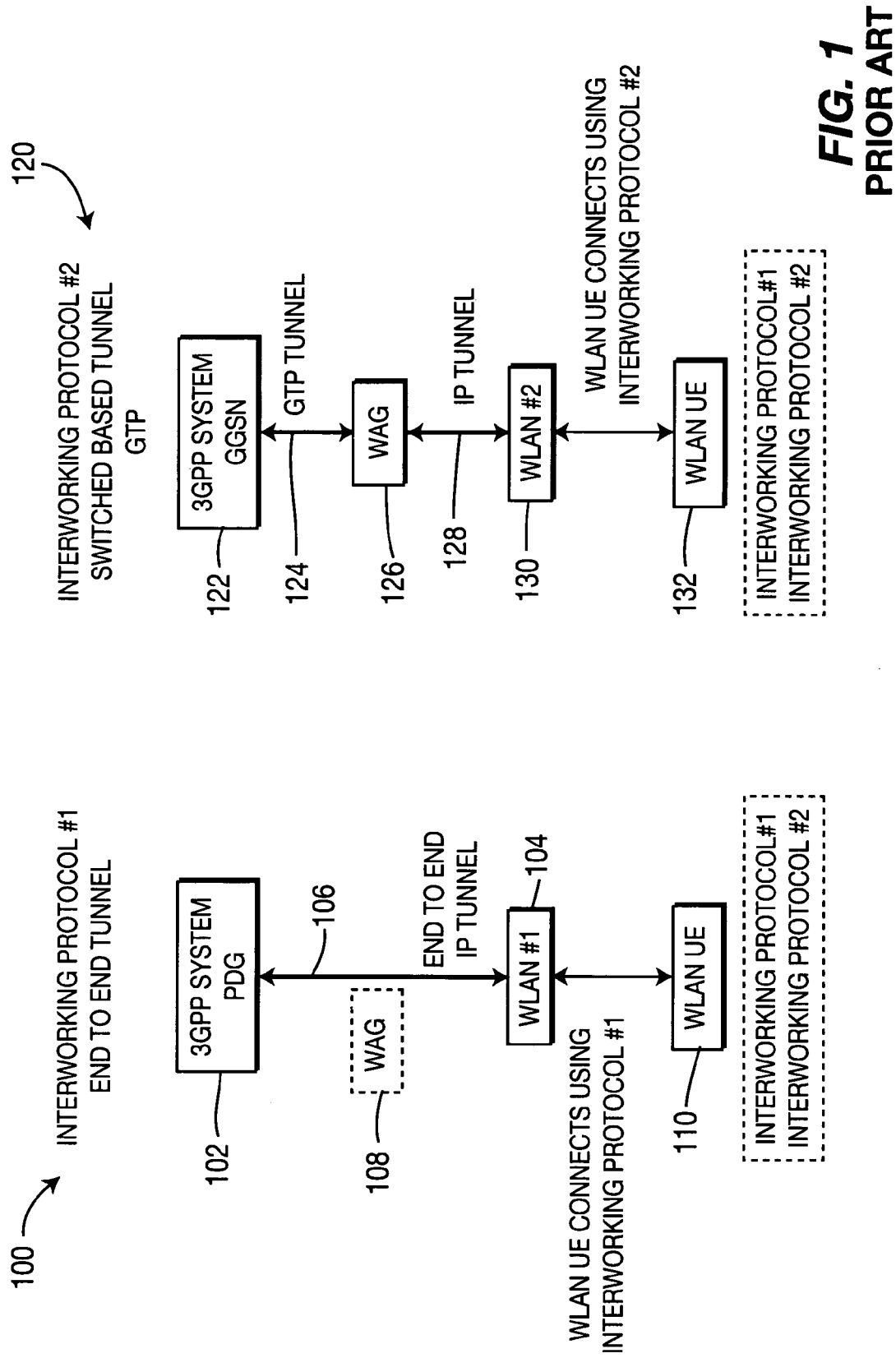
FIG. 1 is a block diagram of two interworking protocols by which an I-WLAN UE can access a 3GPP system.

FIG. 1 is a block diagram of two systems using interworking protocols by which an I-WLAN UE can access a cellular system, such as a 3GPP system. Although the following is described in conjunction with a 3GPP system, it can also be used with other cellular systems, such as 3GPP2, GPRS/EDGE, etc. A system 100 utilizing the end to end tunnel protocol includes a 3GPP system packet data gateway (PDG) 102, which provides the connection between a 3GPP network and a WLAN. The PDG 102 communicates with a first WLAN 104 via an end to end IP tunnel 106. The tunnel 106 is created through a WLAN gateway (WAG) 108, which is the interface between the WLAN 104 and a 3GPP network. A WLAN UE 110 communicates with the 3GPP network through the WLAN 104, the tunnel 106, and the PDG 102. In the system 100, the tunnel 106 extends from the PDG 102 down to the WLAN UE 110.

A system 120 utilizes the switched tunneling protocol (general packet radio service (GPRS) tunneling protocol (GTP)). The system 120 includes a 3GPP system gateway GPRS support node (GGSN) 122 that communicates via a GTP tunnel 124 with a WAG 126. The WAG 126 communicates via an IP tunnel 128 with a second WLAN 130. A WLAN UE 132 communicates with the 3GPP network through the WLAN 130, the IP tunnel 128, the WAG 126, the GTP tunnel 124, and the GGSN 122. The system 120 utilizes two tunnels: the GTP tunnel 124 between the GGSN 122 and the WAG 126 and the IP tunnel 128 between the WAG 126 and the WLAN UE 132. It is noted that in this instance, the use of the PDF and the GGSN are interchangeable.

Figure 2:
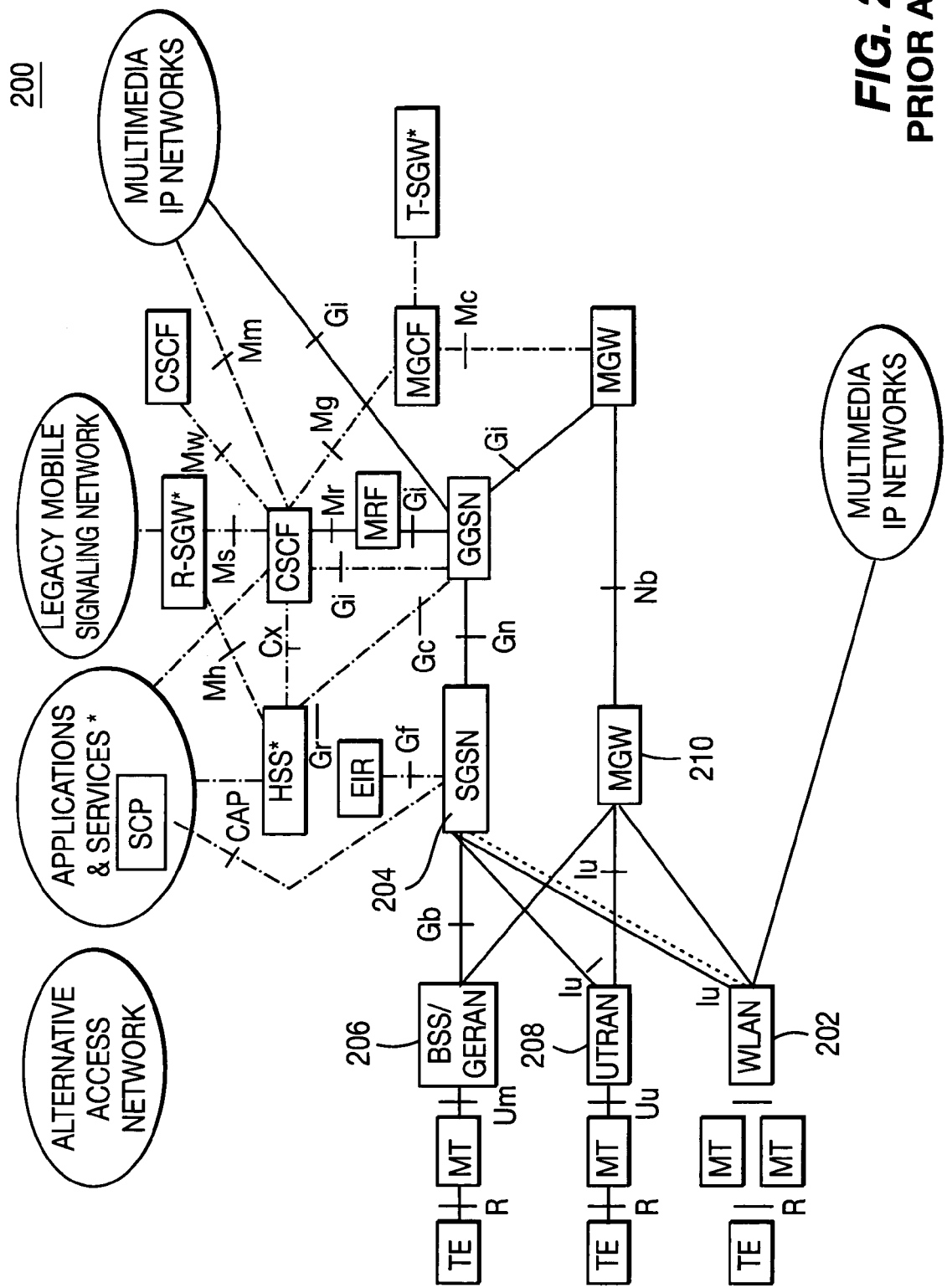
FIG. 2 is a diagram of a third interworking scheme by which an I-WLAN UE can access a 3GPP system.

FIG. 2 is a diagram of the Generic Access interworking protocol 200. FIG. 2 shows the overall architecture for a 3GPP system where a WLAN 202 is connected directly to a serving GPRS support node (SGSN) 204. The WLAN AP acts as an alternative RAN, in parallel with a GSM EDGE radio access network (GERAN) 206 and a UMTS terrestrial radio access network (UTRAN) 208. The WLAN 202 may also be connected to a media gateway (MGW) 210 where the IP-based traffic is to be provided. The 3GPP traffic coming out of the SGSN 204 and directed toward the WLAN 202 is tunneled using an IP tunnel and is transported over the WLAN 202 to a WLAN UE. The WLAN UE then de-tunnels the IP data (i.e., 3GPP traffic) and forwards it towards the 3GPP-based UE for processing. The WLAN 202 acts as a pipe for the 3GPP traffic.

Other interworking scenarios between a 3GPP system and a WLAN UE are also possible. The systems 100, 120, and 200 are exemplary, and other interworking scenarios can be used in the context of the present invention.

Figure 3:
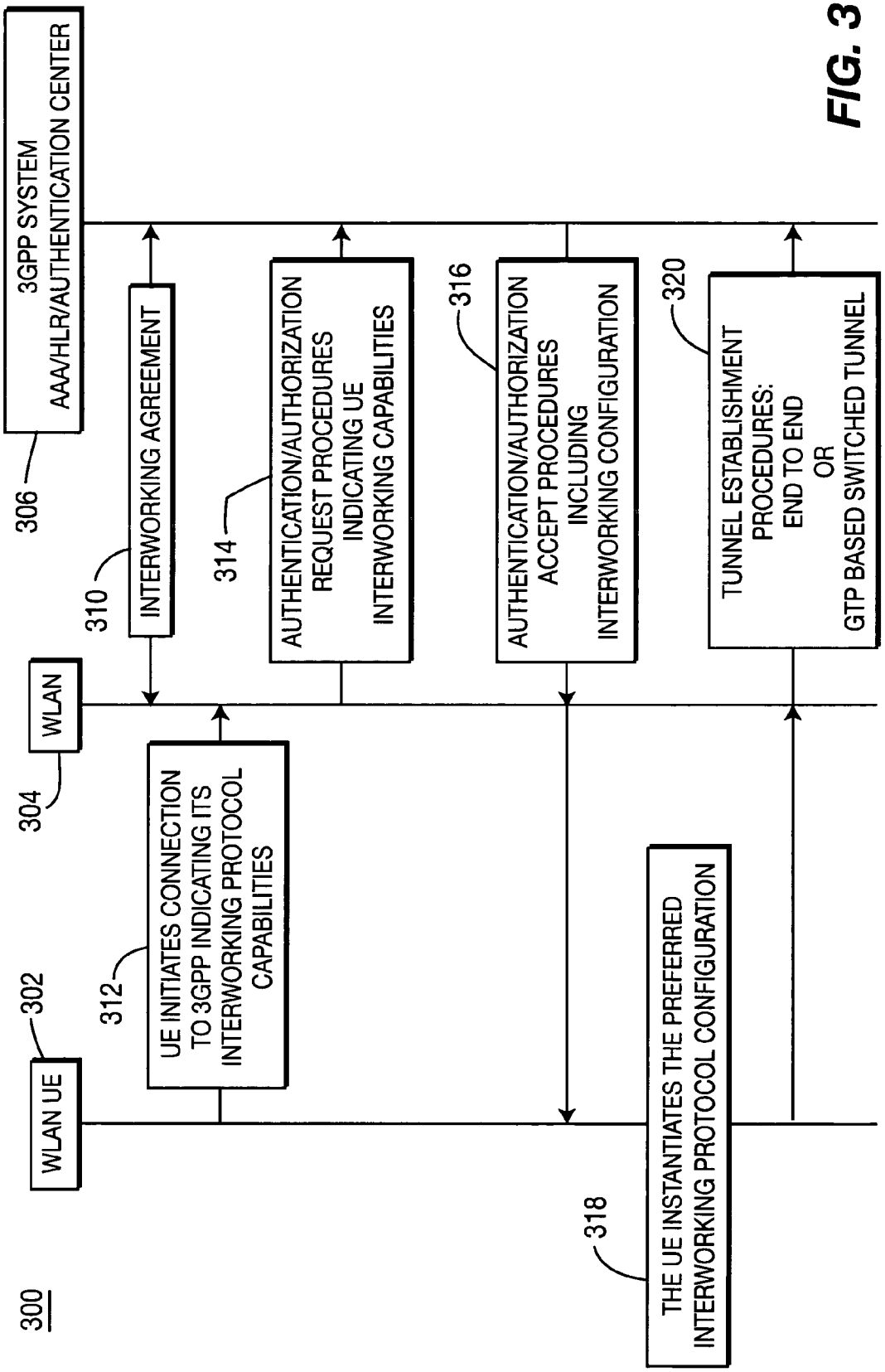
FIG. 3 is a flow diagram a method for configuring an I-WLAN UE to access a 3GPP system in accordance with the present invention.

FIG. 3 is a flow diagram of a method 300 for configuring an I-WLAN UE to access a 3GPP system in accordance with the present invention. The method 300 uses the WLAN UE 302, a WLAN 304, and the 3GPP system 306 which includes an authentication, authorization, and accounting (AAA) server and a home location register (HLR).

The WLAN 304 and the 3GPP system 306 exchange an interworking agreement (step 310). The interworking agreement is a service profile of the WLAN 304 and the 3GPP system 306, and specifies parameters such as the level of interworking, whether the user is allowed to access certain services, the bit rate, etc.

The UE 302 initiates a connection to the 3GPP system 306 and in the connection signaling indicates its interworking protocol capabilities (step 312). The WLAN 304 forwards the authentication and authorization request procedures to the 3GPP system 306, indicating the UE's interworking protocol capabilities (step 314).

The 3GPP system 306 performs authentication and authorization acceptance procedures, including identifying the interworking configuration supported by the 3GPP system 306 to the WLAN 304 and the UE 302 (step 316). The 3GPP system 306 indicates to the UE 302 the supported interworking protocol and directs the UE 302 to use it.

The UE 302 instantiates the preferred interworking protocol configuration (step 318). If the UE 302 can support both configurations, the 3GPP system 306 directs the UE 302 to use its preferred mode of operation. If the UE 302 is capable only of supporting the end to end tunneling architecture and the 3GPP system 306 can support both modes of operation, then the 3GPP system 306 may accept the UE's attachment request and provides the services using the end to end tunneling solution. If the UE 302 and 3GPP system 306 do not support the same configuration, then the 3GPP system 306 must reject the UE's attachment request and indicate to the UE 302 that the configuration request during the attachment procedure (step 312) is not supported.

The WLAN 304 initiates tunnel establishment procedures (either end to end tunneling or GTP based switched tunneling) with the 3GPP system (step 320).

The method 300 allows for the exchange of information during attachment of the UE 302 regarding which type of tunneling to expect. Because each type of tunneling has different set-up procedures, the exchange of information simplifies the interworking set-up.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for configuring a user equipment (UE) to access a third generation partnership project (3GPP) network, comprising:

initiating a connection from the UE to the 3GPP network, including indicating the UE's interworking protocol capabilities;

requesting authentication and authorization of the UE connection to the 3GPP network, including indicating the UE's interworking protocol capabilities;

determining whether to accept the UE's request, including examining the UE's interworking protocol capabilities; and instantiating an interworking protocol, whereby the UE is configured to interwork with the 3GPP network, wherein the interworking protocol is selected from the group consisting of: end to end tunneling, switched tunneling, and generic access.

2. The method according to claim 1, wherein if the UE supports all protocols, then said instantiating includes the 3GPP network directing the UE to use the 3GPP network's preferred protocol.

3. The method according to claim 1, wherein if the UE supports one protocol, then said instantiating includes using the protocol supported by the UE.

4. The method according to claim 1, wherein if the UE and the 3GPP network do not support the same protocol, then said determining includes the 3GPP network rejecting the UE's connection request.

5. A user equipment (UE), comprising:

an initiating device configured to initiate a connection request to a third generation partnership project (3GPP) network;

an indicating device configured to indicate interworking protocol capabilities of the UE to an interworking wireless local area network (I-WLAN) wherein the I-WLAN indicates the interworking protocol capabilities of the UE to the 3GPP network; and an instantiating device configured to instantiate a selected interworking protocol, wherein the interworking protocol is selected from the group consisting of:

end to end tunneling, switched tunneling, and generic access.

6. The UE according to claim 5, wherein said instantiating device instantiates an interworking protocol selected by the 3GPP network.

7. The UE according to claim 6, wherein if the UE supports more than one interworking protocol, then said instantiating device instantiates an interworking protocol preferred by the 3GPP network.

8. The UE according to claim 6, wherein if the UE supports only one interworking protocol, then said instantiating device instantiates the interworking protocol supported by the UE.

9. The UE according to claim 5, wherein if the UE and the 3GPP network do not support the same interworking protocol, then the 3GPP network rejects the connection request made by said initiating device.

* * * * *